United States Patent
Devine et al.

(10) Patent No.: US 7,799,465 B2
(45) Date of Patent: Sep. 21, 2010

(54) CELLS

(75) Inventors: John Neil Devine, Lancashire (GB);
Brian Wilson, Lancashire (GB)

(73) Assignee: Victrex Manufacturing Limited,
Lancashire (GB)

( * ) Notice: Subject to any disclaimer, the term of this patent is extended or adjusted under 35 U.S.C. 154(b) by 1514 days.

(21) Appl. No.: 10/490,422

(22) PCT Filed: Sep. 18, 2002

(86) PCT No.: PCT/GB02/04242

§ 371 (c)(1),
(2), (4) Date: Apr. 28, 2004

(87) PCT Pub. No.: WO03/028139

PCT Pub. Date: Apr. 3, 2003

(65) Prior Publication Data

US 2004/0258999 A1    Dec. 23, 2004

(30) Foreign Application Priority Data

Sep. 26, 2001    (GB) ................ 0123109.1

(51) Int. Cl.
*H01M 2/16* (2006.01)
(52) U.S. Cl. .................................. 429/253
(58) Field of Classification Search ............ None
See application file for complete search history.

(56) References Cited

U.S. PATENT DOCUMENTS

| | | | |
|---|---|---|---|
| 4,268,650 A | 5/1981 | Rose | |
| 4,273,903 A | 6/1981 | Rose | |
| 4,320,224 A | 3/1982 | Rose et al. | |
| 4,413,106 A | 11/1983 | Coplan et al. | |
| 4,419,486 A * | 12/1983 | Rose ........................... | 525/534 |
| 5,362,836 A | 11/1994 | Helmer-Metzmann et al. | |
| 5,438,082 A | 8/1995 | Helmer-Metzmann et al. | |
| 5,438,882 A | 8/1995 | Karim-Panahi et al. | |
| 5,561,202 A | 10/1996 | Helmer-Metzmann et al. | |
| 5,741,408 A | 4/1998 | Helmer-Metzmann et al. | |
| 5,795,496 A | 8/1998 | Yen et al. | |
| 5,834,566 A | 11/1998 | Helmer-Metzmann et al. | |
| 5,847,032 A | 12/1998 | Arnold et al. | |
| 7,097,932 B1 * | 8/2006 | Sakai et al. ................... | 429/40 |

FOREIGN PATENT DOCUMENTS

| | | |
|---|---|---|
| EP | 0 008 895 | 3/1980 |
| EP | 0 041 780 | 12/1981 |
| EP | 0 029 633 B1 | 10/1983 |
| EP | 0 100 587 A2 | 2/1984 |
| EP | 0 382 440 | 8/1990 |

(Continued)

*Primary Examiner*—Patrick Ryan
*Assistant Examiner*—Karie O'Neill Apicella
(74) *Attorney, Agent, or Firm*—Nixon & Vanderhye

(57) ABSTRACT

There is described a fuel cell or electrolytic cell comprising an ion-conductive polymeric material which includes a first repeat unit of formula (I): —(O-$Ph^1$-CO-$Ph^1$-O-$Ph^1$-CO-$Ph^1$)-, and a second repeat unit of formula (II): —(O-$Ph^2$-O-$Ph^3$-CO-$Ph^4$)-, or of formula (III): (O-$Ph^2$-O-$Ph^3$-$SO_2$-$Ph^4$)-; wherein $Ph^1$, $Ph^2$, $Ph^3$ and $Ph^4$ independently represent phenyl moieties and wherein said second repeat unit is provided with ion-exchange sites. The polymeric material may include a third repeat unit which is amorphous.

19 Claims, 1 Drawing Sheet

FOREIGN PATENT DOCUMENTS

Figure 1:
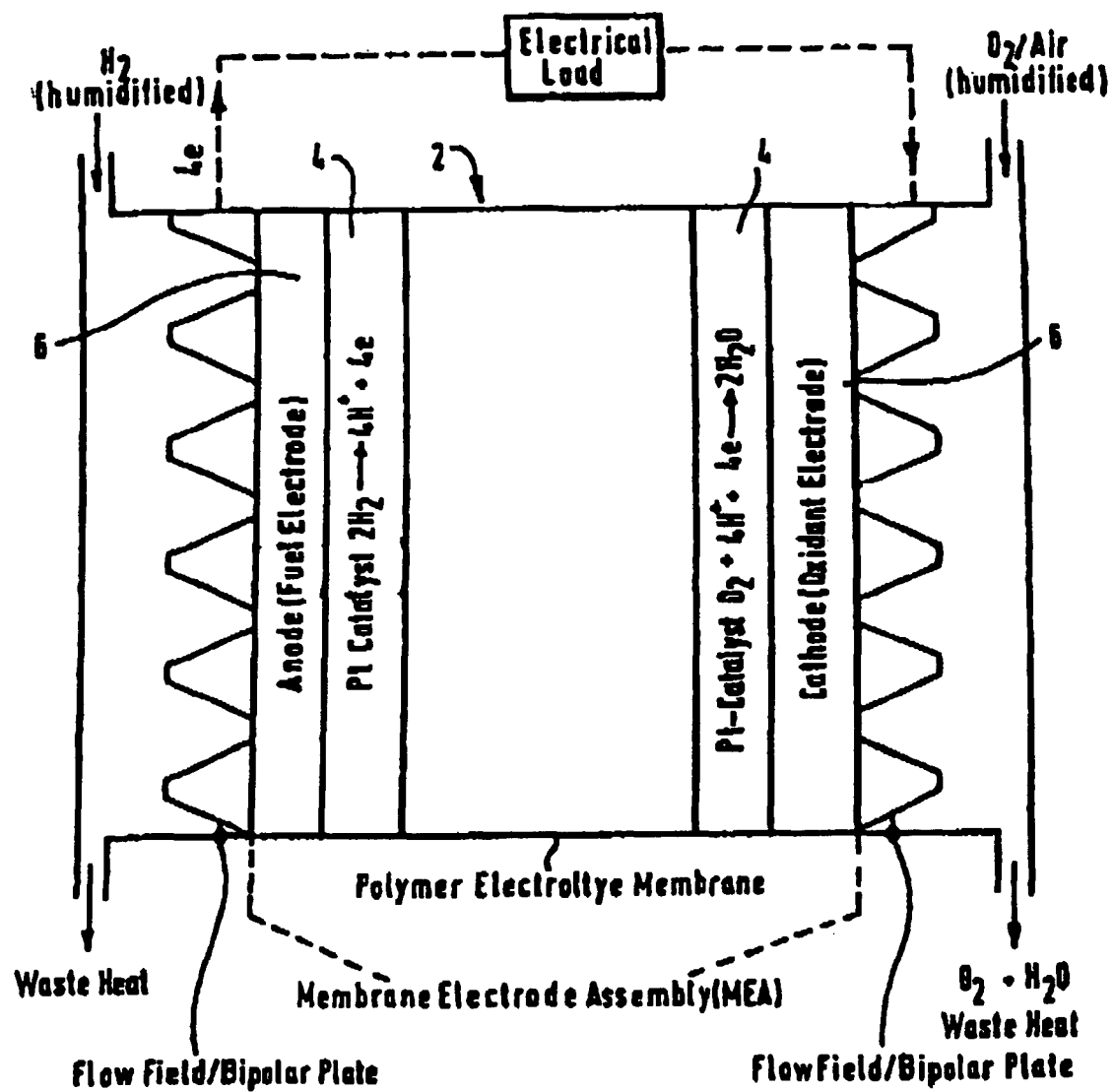

| | | |
|---|---|---|
| EP | 0 575 807 | 12/1993 |
| JP | 06-093114 | 4/1994 |
| JP | 2001-029800 | 2/2001 |
| WO | WO 96/29360 | 9/1996 |
| WO | WO 99/29763 | 6/1999 |

* cited by examiner

CELLS

This application is the U.S. National Phase of International Application PCT/GB02/04242, filed 18 Sep. 2002, which designated the U.S.

This invention relates to cells and particularly, although not exclusively, relates to a fuel cell per se and an electrolytic cell per se. Especially preferred embodiments relate to fuel cells.

One type of polymer electrolyte membrane fuel cell (PEMFC), shown schematically in FIG. 1 of the accompanying diagrammatic drawings, may comprise a thin sheet 2 of a hydrogen-ion conducting Polymer Electrolyte Membrane (PEM) sandwiched on both sides by a layer 4 of platinum catalyst and an electrode 6. The layers 2, 4, 6 make up a Membrane Electrode Assembly (MEA) of less than 1 mm thickness.

In a PEMFC, hydrogen is introduced at the anode (fuel electrode) which results in the following electrochemical reaction:

Pt-Anode (Fuel Electrode) $2H_2 \rightarrow 4H^+ + 4e^-$

The hydrogen ions migrate through the conducting PEM to the cathode. Simultaneously, an oxidant is introduced at the cathode (oxidant electrode) where the following electrochemical reaction takes place:

Pt-Cathode (Oxidant Electrode) $O_2 + 4H^+ + 4e^- \rightarrow 2H_2O$

Thus, electrons and protons are consumed to produce water and heat. Connecting the two electrodes through an external circuit causes an electrical current to flow in the circuit and withdraw electrical power from the cell.

Preferred ion-conducting polymeric materials for use as components of polymer electrolyte membranes in fuel cells have high conductivity (low EW, or high ion-exchange capacities) and optimum water uptake for good conductivity and mechanical properties. To increase conductivity of a polymeric material it may be provided with an increased concentration of ion-exchange sites, for example sulphonate groups. However, the greater the ionic character of the polymeric material, the more soluble the polymeric material is likely to be in water and/or the water absorbance of the polymeric material may increase too much. Since water at high temperature is generated as a bi-product of the electrochemical reaction in a fuel cell, the greater the solubility and/or water uptake of the polymeric material, the greater the rate of disintegration of the polymeric material and the lower the useful lifetime of the cell.

U.S. Pat. No. 5,362,836 (Hoechst) discloses, in the specific examples, only the preparation of sulphonated polyetheretherketone and sulphonated polyetheretheretherketoneketone homopolymers. The sulphonation conditions are varied to vary the level of sulphonation and, therefore, properties of the polymers. No values are given for the boiling water uptake of the sulphonated polymers prepared. Furthermore, it should be appreciated that it is difficult to precisely control and/or reproduce the level of sulphonation and, consequently, the properties of the ion-conductive polymers and that this could lead to difficulties in producing polymers of the type described for commercial use.

U.S. Pat. No. 5,438,082 (Hoechst), U.S. Pat. No. 5,561,202 (Hoechst) and U.S. Pat. No. 5,741,408 (Hoechst) address the problem of preparing polymer electrolyte membranes comprising sulphonated aromatic polyetherketones which have increased stability. The solution described involves the preparation of sulphonated aromatic polyetherketone polymers, conversion of sulphonate groups of the polymers to sulphonyl chloride groups, treatment of the sulphonyl chloride groups with an amine containing at least one cross-linkable substituent to produce a sulphonamide group, hydrolysing unreacted sulphonyl chloride groups, isolating the resultant aromatic sulphonamide and dissolving it in an organic solvent, converting the solution into a film and then cross-linking the crosslinkable substituents in the film.

U.S. Pat. No. 5,795,496 (California Institute of Technology) describes polymer materials for electrolyte membranes in fuel cells which are intended to have high proton conductivity and be stable at high temperature. Preferred materials are sulphonated polyetheretherketone or sulphonated polyethersulphone. These materials are modified, by controlled cross-linking of sulphonate groups, to provide materials with asymmetric permeability properties.

U.S. Pat. No. 5,834,566 (Hoechst) addresses the problem of providing films of improved properties for electrochemical uses. The solution described is the provision of homogenous polymer alloys, for example of sulphonated polyetherketone and non-sulphonated polyethersulphone, in combination with a hydrophilic polymer, for example of polyvinylpyrrolidone or polyglycol dimethylether.

WO96/29360 (Hoechst) addresses the problem of increasing the level of sulphonation of polyetherketones by providing a method of sulphonating —O-phenyl-CO— units thereof. The specific examples disclose the application of the method to polyetheretherketone and polyetheretherketoneketone homopolymers.

It will be appreciated from the above that there have been many proposed solutions to the problem of providing suitable ion-conductive polymeric materials for use in fuel cells and that some of the proposals are complex, for example by including multi-step processes, potentially expensive and/or difficult to reproduce on a commercial scale.

It is an object of the present invention to provide an ion-conductive polymeric material for a fuel cell or electrolytic cell which may be improved compared to prior art proposals.

The present invention is based on the discovery of certain copolymers which are surprisingly advantageously adapted for use in fuel cells or electrolytic cells.

According to a first aspect of the invention, there is provided a fuel cell or an electrolytic cell comprising an ion-conductive polymeric material which includes a first repeat unit of formula $$-(O-Ph^1-CO-Ph^1-O-Ph^1-CO-Ph^1)- \qquad \text{I}$$

and a second repeat unit of formula $$-(O-Ph^2-O-Ph^3-CO-Ph^4)- \qquad \text{II}$$

or of formula $$-(O-Ph^2-O-Ph^3-SO_2-Ph^4)- \qquad \text{III}$$

wherein $Ph^1$, $Ph^2$, $Ph^3$ and $Ph^4$ independently represent phenyl moieties and wherein said second repeat unit is provided with ion-exchange sites.

Surprisingly, it is found that ion-conductive polymeric materials of the type described have boiling water uptakes, when used in fuel cells and/or electrolytic cells, which are much lower than expected and, more particularly, much lower than found for ion-conductive polymeric materials of similar equivalent weights (EW) comprising a single ion-conducting homopolymer of formula I, II or III.

Unless otherwise stated in this specification, a phenyl moiety may have 1,4- or 1,3-, especially 1,4-, linkages to moieties to which it is bonded.

Said ion-conductive polymeric material is preferably crystalline.

The existence and/or extent of crystallinity in a polymer is preferably measured by wide angle X-ray diffraction, for example as described by Blundell and Osborn (Polymer 24, 953, 1983). Alternatively, Differential Scanning Calorimetry (DSC) could be used to assess crystallinity. The level of crystallinity in said ion-conductive polymeric material may be at least 0.5% suitably at least 1%, preferably at least 5%, more preferably at least 10%, especially at least 15% weight fraction, suitably when measured as described by Blundell and Osborn. In some cases, the level of crystallinity, when measured as described may be at least 20% weight fraction. The level of crystallinity in said first polymeric material may be less than 30% weight fraction, preferably less than 25% weight fraction.

Said ion-conductive polymeric material suitably includes a repeat unit which is crystalline and a repeat unit which is amorphous. Said first repeat unit is preferably crystalline. Preferably, less than 1 mole % of groups $Ph^1$ in said polymeric material are sulphonated and/or otherwise functionalised. Preferably, said first repeat unit comprises unsubstituted phenyl groups $Ph^1$ with said groups $Ph^1$ suitably having 1,4-linkages to the —O— and —CO— groups to which they are bonded. Preferably, substantially no groups $Ph^1$ are substituted in said ion-conductive polymeric material.

Said second repeat unit preferably includes ion-exchange sites. Suitably, to provide said ion-exchange sites, said second repeat unit is sulphonated, phosphorylated, carboxylated, quaternary-aminoalkylated or chloromethylated, and optionally further modified to yield —$CH_2PO_3H_2$, —$CH_2NR_3^{20+}$ where $R^{20}$ is an alkyl, or —$CH_2NAr_3^{x+}$ where $Ar^x$ is an aromatic (arene), or provided with —$OSO_3H$ or —$OPO_3H_2$ cationic exchange sites as described in WO95/08581.

Preferably, said second repeat unit is sulphonated. Preferably, the only ion-exchange sites of said second repeat unit are sites which are sulphonated.

References to sulphonation include a reference to substitution with a group —$SO_3M$ wherein M stands for one or more elements selected with due consideration to ionic valencies from the following group: H, $NR_4^{y+}$, in which $R^y$ stands for H, $C_1$-$C_4$ alkyl, or an alkali or alkaline earth metal or a metal of sub-group 8, preferably H, $NR_4^+$, Na, K, Ca, Mg, Fe, and Pt. Preferably M represents H.

Preferably less than 1 mole % of groups $Ph^3$ in said second unit are sulphonated and/or otherwise functionalised. Preferably less than 1 mole % of groups $Ph^4$ are sulphonated and/or otherwise functionalised. Preferably, substantially no groups $Ph^3$ are substituted. Preferably, substantially no groups $Ph^4$ are substituted. Preferably $Ph^3$ represents an unsubstituted phenyl group, suitably having 1,4-linkages to the —O— and —CO— (or —$SO_2$—) groups to which it is bonded. Preferably, $Ph^4$ represents an unsubstituted phenyl groups, suitably having 1,4-linkages to the —O— and —CO— (or —$SO_2$—) groups to which it is bonded.

Suitably, greater than 70 mole %, preferably greater than 80 mole %, more preferably greater than 90 mole % of groups $Ph^2$ in said second unit are provided with ion-exchange sites, especially sulphonate groups. Groups $Ph^2$ may be provided with a single ion-exchange site—i.e. they are preferably only monosulphonated.

In general terms, phenyl groups of —O-phenyl-O— moieties (e.g. $Ph^2$) may be provided with ion-exchange sites, for example sulphonated, readily, e.g. using the relatively mild method described in Examples 2a to 2c hereinafter, (i.e. using a sulphuric acid concentration of less than 98.5% and avoiding the use of oleum) so that up to 100 mole % of the phenyl groups are provided with ion-exchange sites (e.g. sulphonated). However, the phenyl groups of —O-phenyl-CO— moieties and of —O-phenyl-$SO_2$— moieties (e.g. $Ph^1$, $Ph^3$ and $Ph^4$) are relatively difficult to provide with ion-exchange sites (and, therefore, are not provided with ion-exchange sites) due to deactivation of the phenyl moieties by —CO— or —$SO_2$— groups.

Preferably, $Ph^2$ represents a phenyl group provided with an ion-exchange site wherein the phenyl group has 1,4-linkages to the —O— groups to which it is bonded.

Said second unit suitably is, by virtue of it being provided with ion-exchange sites, amorphous.

Said ion-conductive polymeric material could include repeat units of formula II and III, each of which is provided with ion-exchange sites. Preferably, however, it includes either unit II or unit III (and not both).

An especially preferred second repeat unit is of formula II. Thus, said second repeat unit is preferably an -ether-(monosulphonated)phenyl-ether-(unsubstituted)phenyl-carbonyl-(unsubstituted)phenyl- unit.

Suitably, "a" represents the mole % of units of formula I in said ion-conductive polymeric material, and "b" represents the sum of the mole % of units of formulae II and III in said polymeric material. Suitably, the ratio of "a" to "b" in said polymeric material is less than 4, preferably less than 3, more preferably less than 2, especially less than 1. The ratio of "a" to "b" may be at least 0.15, suitably at least 0.25, preferably at least 0.3, more preferably at least 0.4, especially at least 0.5.

Said ion-conductive polymeric material may be a random or block copolymer comprising units I, II and/or III. Preferably, said ion-conductive polymeric material is a random copolymer.

Said ion-conductive polymeric material may include a third repeat unit which is suitably different from units I, II and III. Said third unit is preferably amorphous. Said third unit is preferably not crystalline or crystallisable. Said third unit is preferably not provided with ion-exchange sites. Said optional third unit preferably includes phenyl groups linked by —CO—, —$SO_2$—, —O— and/or —S— provided said third unit is more difficult to provide with ion-exchange sites (e.g. sulphonate) compared to the ease with which said second unit (prior to its functionalisation as described) can be provided with ion-exchange sites (e.g. sulphonated) and provided said third unit is amorphous. To this end, said third unit suitably includes a means to render it amorphous (hereinafter "said amorphous means") and/or not crystallisable with polyetherketone units. Said third unit may include a moiety of formula -Q-Z-Q- wherein Z represents an aromatic group containing moiety and Q is —O— or —S—, wherein said unit of formula -Q-Z-Q- is not symmetrical about an imaginary line which passes through the two -Q- moieties provided, however, that said unit is not derived from dihydroxybenzophenone substituted by groups Q at the 4- and 4'-positions (since such a benzophenone acts in the manner of a symmetrical moiety by virtue of the carbonyl group being substantially similar to an ether group thereby allowing the carbonyl group to be interchanged with an ether group in a polyaryletherketone crystal lattice).

Examples of units of formula -Q-Z-Q- (especially where Q is —O—) are as follows:

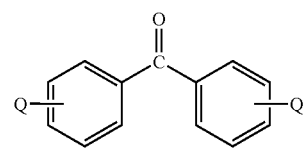

All isomers but not 4,4'-isomer

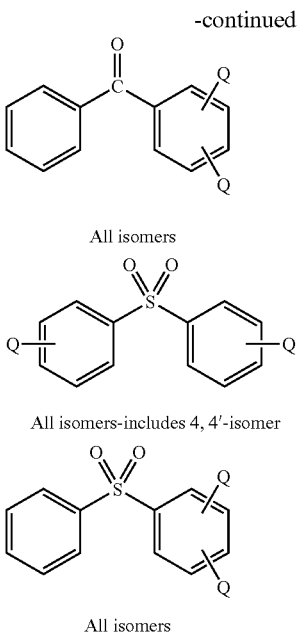

All isomers

All isomers-includes 4, 4'-isomer

All isomers

Said third repeat unit preferably includes at least one of the following: a sulphone moiety in the polymer backbone; a 1,3-disubstituted phenyl moiety in the polymer backbone; or a functional group pendent from a phenyl moiety in the polymer backbone.

Preferred optional third units are of general formula

—O-Ph-$(SO_2$-Ph$)_{n1}$-(CO-Ph$)_{n2}$-[AMOR]—    IV wherein Ph represents a phenyl group, n1 is 0, 1 or 2, n2 is 0, 1 or 2 and AMOR represents an amorphous unit, for example of formulae:

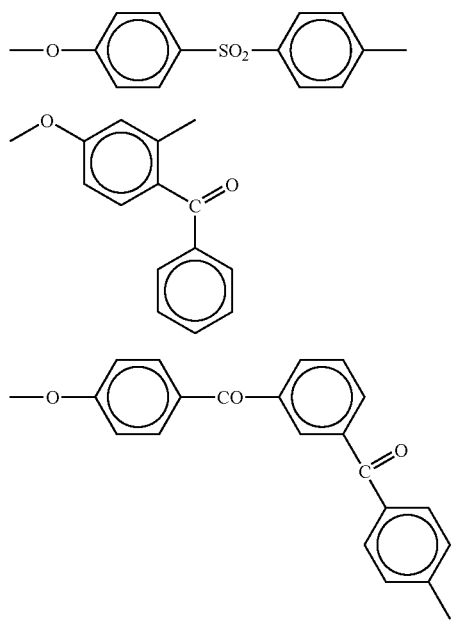

The phenyl groups of the third unit of formula IV may be 1,3- or 1,4-substituted by the groups shown. Preferably, they are 1,4-substituted.

Preferred third units are: -ether-phenyl-ketone-phenyl-[AMOR]- (i.e. n1=0, n2=1), -ether-phenyl-sulphone-phenyl-[AMOR]- (i.e. n1=1, n2=0), where [AMOR] represents V, VI or VII.

Preferably, "c" represents the mole % of said third units in said ion-conductive polymeric material and "a" and "b" are as described above. The ratio of "c" to the sum of "a" and "b" is suitably less than 0.25, preferably less than 0.2, more preferably less than 0.15, especially less than 0.125.

Suitably, "c" is 30 mole % or less, preferably 20 mole % or less, more preferably 15 mole % or less, especially 10 mole % or less. Suitably "a" is at least 30 mole %, preferably at least 40 mole %, more preferably at least 45 mole %, especially at least 50 mole %. Suitably, "a" is 85 mole % or less. Suitably, "b" is at least 70 mole % or less, preferably 60 mole % or less, more preferably 55 mole % or less, especially 50 mole % or less.

The equivalent weight (EW) of said ion-conductive polymeric material is preferably less than 850 g/mol, more preferably less than 800 g/mol, especially less than 750 g/mol. The EW may be greater than 300, 400 or 500 g/mol.

The boiling water uptake of ion-conductive polymeric material measured as described in Example 4 is suitably less than 350%, preferably less than 300%, more preferably less than 250%.

The glass transition temperature ($T_g$) of said ion-conductive polymeric material may be at least 144° C., suitably at least 150° C., preferably at least 154° C., more preferably at least 160° C., especially at least 164° C. In some cases, the Tg may be at least 170° C., or at least 190° C. or greater than 250° C. or even 300° C.

Said ion-conductive polymeric material may have an inherent viscosity (IV) of at least 0.1, suitably at least 0.3, preferably at least 0.4, more preferably at least 0.6, especially at least 0.7 (which corresponds to a reduced viscosity (RV) of at least 0.8) wherein RV is measured at 25° C. on a solution of the polymer in concentrated sulphuric acid of density 1.84 gcm$^{-3}$, said solution containing 0.1 g of polymer per 100 cm$^{-3}$ of solution. IV is measured at 25° C. on a solution of polymer in concentrated sulphuric acid of density 1.84 gcm$^3$, said solution containing 0.1 g of polymer per 100 cm$^3$ of solution. The measurements of both RV and IV both suitably employ a viscometer having a solvent flow time of approximately 2 minutes.

The main peak of the melting endotherm (Tm) for said ion-conductive polymeric material may be at least 300° C.

Said semi-crystalline polymer may comprise a film, suitably having a thickness of less than 1 mm, preferably less than 0.5 mm, more preferably less than 0.1 mm, especially less than 0.05 mm. The film may have a thickness of at least 5 μm.

The invention of the first aspect preferably relates to a fuel cell. Said ion-conductive polymeric material preferably comprises a part of an ion-conducting membrane of said fuel cell. Said ion-conducting membrane is preferably substantially non-permeable. Said ion-conductive membrane may consist essentially of said ion-conductive polymeric material. In this case, said membrane comprises a unitary material which may define a PEM of the fuel cell. A catalyst material may be associated with the polymeric material, suitably on opposite sides thereof. Alternatively, said ion-conductive polymeric material may be part of a composite ion-conducting membrane. Said composite ion-conducting membrane may comprise said ion-conductive polymeric material blended with other ion-conducting or non-ion-conducting amorphous or crystalline polymeric materials. Alternatively, said ion-conductive polymeric material may be associated with a composite membrane material. For example, said ion-conductive polymeric material in the form of an unsupported conductive polymer film can be contacted with, for example laminated to, a said composite membrane material. Alternatively, one of either said composite membrane material or said ion-conductive polymeric material may be impregnated with the other one of either said composite membrane material or said ion-conductive polymeric material.

Said composite membrane material may be a support material for supporting said ion-conductive polymeric material. In this case, said composite membrane material preferably is stronger and/or has a lower water absorbance compared to said ion-conductive polymeric material.

Alternatively, said ion-conductive polymeric material may be a support for the composite membrane material.

The invention extends to a plurality of fuel cells as described according to the first aspect. The fuel cells are preferably substantially identical to one another and are preferably provided in a stack in series. Greater than 50 or even greater than 100 of said fuel cells may be provided in a said stack.

Said plurality of fuel cells may together include more than $0.1 \text{ m}^2$, suitably more than $0.5 \text{ m}^2$, preferably more than $1 \text{ m}^2$, more preferably more than $5 \text{ m}^2$ of said ion-conductive polymeric material. The amount of said ion-conductive polymeric material may be less than $100 \text{ m}^2$.

According to a second aspect of the invention, there is provided a polymer electrolyte membrane for a fuel cell or electrolytic cell (especially for a fuel cell), the membrane comprising an ion-conductive polymeric material as described according to said first aspect.

Said polymer electrolyte membrane (PEM) may have a dimension in a first direction of at least 1 cm. The dimension of the PEM in a second direction, perpendicular to the first direction, may also be at least 1 cm. Where the PEM is circular, the diameter may be at least 1 cm. In some cases, for example for vehicle applications, the dimension(s) in the first and/or second direction(s) may be at least 10 cm or at least 20 cm. The dimension(s) in the first and second direction(s) is/are suitably less than 100 cm, preferably less than 50 cm, more preferably less than 35 cm.

Said PEM may comprise one or more layers wherein, suitably, at least one layer comprises a film of said semi-crystalline polymer. Said membrane may have a thickness of at least 5 µm and, suitably, less than 1 mm, preferably less than 0.5 mm, more preferably less than 0.1 mm, especially less than 0.05 mm.

According to a third aspect of the invention, there is provided a membrane electrode assembly for a fuel cell which comprises an ion-conductive polymeric material according to said first aspect associated with a catalyst material. Catalyst material is preferably associated with opposing sides of the ion-conducting polymeric material.

According to a fourth aspect of the present invention, there is provided a method of making a fuel cell or electrolytic cell, the method comprising incorporating an ion-conductive polymeric material according to said first aspect into said fuel cell or electrolytic cell.

According to a fifth aspect of the invention, there is provided a method of making a fuel cell or electrolytic cell, the method comprising incorporating, into the fuel cell or electrolytic cell, an ion-conductive polymeric material prepared by:

(A) polycondensing 4,4'-dihydroxybenzophenone (DHB), 4,4'-difluorobenzophenone (BDF) and hydroquinone (HQ);
(B) treating the polymeric material formed with a means for providing said ion-exchange sites.

The polycondensation reaction may, optionally, be carried out in the presence of other monomers. Examples include 4,4'-dichlorodiphenylsulphone (DCDPS) and/or 4,4'-difluorodiphenylsulphone (DFDPS).

The polycondensation reaction described for making an ion-conductive polymeric material according to the first aspect and/or using the method described in the fifth aspect is suitably carried out in the presence of a base, especially an alkali metal carbonate or bicarbonate or a mixture of such bases. Preferred bases for use in the reaction include sodium carbonate and potassium carbonate and mixtures of these.

The identity and/or properties of the polymers prepared in a polycondensation reaction described may be varied according to the reaction profile, the identity of the base used, the temperature of the polymerisation, the solvent(s) used and the time of the polymerisation. Also, the molecular weight of a polymer prepared may be controlled by using an excess of halogen or hydroxy reactants, the excess being, for example, in the range 0.1 to 5.0 mole %

Said means for providing said ion-exchange sites preferably involves sulphonating the polymeric material. Sulphonation conditions are preferably selected wherein $Ph^2$ phenyl groups can be sulphonated but relatively deactivated $Ph^1$, $Ph^3$ and $Ph^4$ phenyl groups generally cannot be sulphonated. To this end, sulphonation may be carried out in concentrated sulphuric acid (suitably at least 96% w/w, preferably at least 97% w/w, more preferably at least 98% w/w; and preferably less than 98.5% w/w) at an elevated temperature. For example, dried polymer may be contacted with sulphuric acid and heated with stirring at a temperature of greater than 40° C., preferably greater than 55° C., for at least one hour, preferably at least two hours, more preferably at least five hours especially at least ten hours. The desired product may be caused to precipitate, suitably by contact with cooled water, and isolated by standard techniques. Advantageously, the method can be used to sulphonate 100 mole % of $Ph^2$ phenyl groups and once this level of sulphonation has been effected no further sulphonation occurs. Thus, there is no need to precisely control the sulphonation conditions (e.g. reaction time) beyond ensuring that the reaction has proceeded long enough to substantially fully mono-sulphonate the $Ph^2$ phenyl groups. This facilitates the preparation of batches of substantially identical ion-conductive polymeric materials and contrasts with processes which need to be stopped when a desired level of sulphonation has been achieved, for example where more vigorous conditions are used to sulphonate —O-phenyl-CO— groups in polymeric materials.

When said ion-conducting polymeric material includes a third unit which is amorphous and not provided with ion-exchange sites, the polycondensation reaction may be carried out in the presence of one or more other monomers. Preferred examples of such other monomers are Bis-S and 2,4-DHB. Other examples are 1,3-bis(4-fluorobenzoyl)benzene(1,3-DKDF) and its sulphone analogue.

Preferred combinations of monomers which after polycondensation and treatment to provide ion-exchange sites (e.g. after sulphonation) may be of utility in fuel cells as described are detailed in the Table below wherein the * in each row indicates the monomers which can be used to prepare preferred polymers. The following abbreviations are used in the table:

| BDF | DHB | HQ | DCDPS/DFDPS | Bis-S | 2,4-DHB | 1,3-DKDF | Sulphone analogue of 1,4-DKDF | Sulphone analogue of 1,3-DKDF |
|---|---|---|---|---|---|---|---|---|
| * | * | * |   |   |   |   |   |   |
| * | * | * |   | * |   |   |   |   |
| * | * | * |   |   | * |   |   |   |
| * | * | * |   |   |   | * |   |   |
| * | * | * |   |   |   |   | * |   |
| * | * | * |   |   |   |   |   | * |
| * | * | * | * |   |   |   |   |   |
| * | * | * | * | * |   |   |   |   |
| * | * | * | * |   | * |   |   |   |
| * | * | * | * |   |   | * |   |   |
| * | * | * | * |   |   |   | * |   |
| * | * | * | * |   |   |   |   | * |

BDF 4,4'-difluorobenzophenone
HQ hydroquinone
DHB 4,4'-dihydroxybenzophenone
Bis-S 4,4'-dihydroxydiphenylsulphone
DCDPS 4,4'-dichlorodiphenylsulphone
DFDPS 4,4'-difluorodiphenylsulphone
2,4-DHB 2,4-dihydroxybenzophenone
1,3-DKDF 1,3-bis-(4-fluorobenzoyl)benzene According to a sixth aspect of the invention, there is provided a method of making a polymer electrolyte membrane of a fuel cell or electrolytic cell (especially of a fuel cell), the method including providing an ion-conductive polymeric material as described herein in solution, forming said solution into a desired form (e.g. casting the solution to form a membrane) and providing conditions for removal of the solvent of said solution.

According to a seventh aspect of the invention, there is provided a method of making a membrane electrode assembly of a fuel cell, the method comprising associating a catalyst material with an ion-conductive polymeric material as described herein.

Any feature of any aspect of any invention or embodiment described herein may be combined with any feature of any aspect of any other invention or embodiment described herein mutatus mutandis.

Specific embodiments of the invention will now be described by way of example.

In the following examples, abbreviations used are as hereinbefore described.

The following products are referred to hereinafter:
PEEK™450P (Trade Mark)—polyetheretherketone obtained from Victrex Plc of Thornton Cleveleys, UK.
PEK™P22 (Trade Mark)—polyetherketone also obtained from Victrex Plc.

Unless otherwise stated, all chemicals referred to hereinafter were used as received from Sigma-Aldrich Chemical Company, Dorset, U.K. 1,3-DKDF can be made as described in Polymer 29, 358 (1988).

EXAMPLE 1a

A 700 ml flanged flask fitted with a ground glass Quickfit lid, stirrer/stirrer guide, nitrogen inlet and outlet was charged with 4,4'-difluorobenzophenone (88.85 g, 0.4072 mole) (BDF), hydroquinone (24.22 g, 0.22 mole) (HQ), 4,4'-dihydroxybenzophenone 38.56 g, 0.18 mole) (DHB) and diphenysulphone (320 g) and purged with nitrogen for over 1 hour. The contents were then heated under a nitrogen blanket to between 140 and 150° C. to form an almost colourless solution. While maintaining a nitrogen blanket, dried sodium carbonate (42.39 g, 0.4 mole) and potassium carbonate (1.10 g, 0.008 mole) were added. The temperature was raised gradually to 330° C. over 3 hours then maintained for 20 minutes.

The reaction mixture was allowed to cool, milled and washed with acetone and water. The resulting polymer was dried in an air oven at 120° C. The polymer had a melt viscosity at 400° C., 1000 sec$^{-1}$ of 0.46 kNsm$^{-2}$.

EXAMPLE 1b

A 700 ml flanged flask fitted with a ground glass Quickfit lid, stirrer/stirrer guide, nitrogen inlet and outlet was charged with 4,4'-difluorobenzophenone (88.85 g, 0.4072 mole), hydroquinone (24.22 g, 0.22 mole), 4,4'-dihydroxybenzophenone (34.32 g, 0.160 mole), 4,4'-dihydroxydiphenylsulphone (5.0 g, 0.02 mole), and diphenysulphone (320 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 330° C. over 3 hours then maintained for 50 minutes.

The reaction mixture was allowed to cool, milled and washed with acetone and water. The resulting polymer was dried in an air oven at 120° C. The polymer had a melt viscosity at 400° C., 1000 sec$^{-1}$ of 0.34 kNsm$^{-2}$.

EXAMPLES 1c-1e

The polymerisation procedure of Example 1b was followed, for 1c-1e, except that copolymer was prepared by varying the mole ratios of the hydroxy-containing reactants and by omission of the potassium carbonate.

A summary of the mole ratios and MVs are detailed in Table 1 below.

TABLE 1

| Example | Polymer Composition (mole ratio) | | | | MV (kNsm$^{-2}$) |
|---|---|---|---|---|---|
| | BDF | HQ | DHB | Bis-S | |
| 1a | 1.02 | 0.55 | 0.45 | — | 0.46 |
| 1b | 1.02 | 0.55 | 0.40 | 0.05 | 0.34 |
| 1c | 1.02 | 0.55 | 0.36 | 0.09 | 0.55 |
| 1d | 1.02 | 0.58 | 0.42 | — | 0.32 |
| 1e | 1.02 | 0.65 | 0.35 | — | 0.34 |

EXAMPLES 2a -2e

Sulphonation of Polymers Examples 1a-1e

The polymers from Examples 1a-1e were sulphonated by stirring the respective polymers in 98% sulphuric acid (7.0 g polymer/100 g sulphuric acid) for >21 hours at 65° C. Thereafter, the reaction solution was allowed to drip into stirred deionised water. Sulphonated polymer was precipitated as free-flowing beads. Recovery was by filtration, followed by washing with deionised water until the pH was neutral and subsequent drying. In general, titration confirmed that 100 mole % of the phenyl groups present as ether-phenyl-ether para linkages had sulphonated, giving one sulphonic acid group, ortho to the ether linkage, on each of the aromatic rings. The phenyl groups present in ether-phenyl-ketone moieties were unsulphonated as were the phenyl groups present in ether-phenyl-ketone-phenyl-ether-sulphones moieties (if present).

EXAMPLES 2f

Sulphonation of Polyetheretherketone (Comparative)

A 500 ml, 3-necked, round-bottomed flask fitted with a stirrer/stirrer guide, nitrogen inlet and outlet and a thermometer was charged with 98% sulphuric acid (180 g). The sulphuric acid was heated under a blanket of nitrogen to 50° C. While maintaining a nitrogen blanket and stirring polyetheretherketone (PEEK™ 450P, Victrex plc) was added. The polymer dissolved and was stirred at 50° C. for 90 minutes. The solution was quickly cooled to 20° C., thereafter allowed to drip into stirred deionised water. Sulphonated polymer precipitated as free-flowing beads. Recovery was by filtration, followed by washing with deionised water until the pH was neutral and subsequent drying. By titration the Equivalent Weight was 644. It should be appreciated that the EW depends on the duration and temperature of the sulphonation reaction—the greater the duration and temperature, the more sulphonated the polymer.

EXAMPLES 2g

Sulphonation of Polyetherketone (Comparative)

A 500 ml, 3-necked, round-bottomed flask fitted with a stirrer/stirrer guide, nitrogen inlet and outlet and a thermometer was charged with 98% sulphuric acid (180 g) and, while stirring, polyetherketone (PEK™ P22, Victrex plc) (20 g) was added. The temperature was increased to 55° C. and oleum (20% free $SO_3$) (120 g) was added. The solution was stirred for 60 minutes at 35° C. The solution was quickly cooled to 20° C., thereafter, allowed to drip into stirred deionised water. Sulphonated polymer precipitated as free-flowing beads. Recovery was by filtration, followed by washing with deionised water until the pH was neutral and subsequent drying. By titration the Equivalent Weight was 667. As for Example 2f, the greater the duration and temperature of the sulphonation reaction, the more sulphonated the polymer.

EXAMPLES 3a-3g

Membrane Fabrication

Membranes were produced from the sulphonated polymers of respective Examples 2a-2g by dissolving respective polymers in N-methylpyrrolidone (NMP). The polymers were dissolved at 80° C. at their maximum concentration. The homogeneous solutions were cast onto clean glass plates and then drawn down to give 400 micron films, using a stainless steel Gardner Knife. Evaporation at 100° C. under vacuum for 24 hours produced membranes of mean thickness 40 microns.

EXAMPLES 4a-4g

Water-Uptake of the Membranes 5 cm×5 cm×40 microns sample of the membranes from Examples 3a-3g were immersed in boiling deionised water (500 ml) for 60 mins, removed and dried quickly with lint-free paper to remove surface water, weighed, dried in an oven at 50° C. for 1 day, allowed to cool to ambient temperature in a desiccator then weighed quickly. The % water-uptake was calculated as follows and the results are provided in Table 2.

$$\% \text{ Water-uptake} = \frac{\text{Wet Weight} - \text{Dry Weight}}{\text{Dry Weight}} \times 100$$

TABLE 2

| Sulphonated polymer from Example No. | Boiling water uptake as described in Example 4 (%) | Theoretical EW | Actual EW (by titration) |
|---|---|---|---|
| 3a | 59 | 690 | 700 |
| 3b | 93 | 692 | 667 |
| 3c | 135 | 695 | 733 |
| 3d | 106 | 645 | 641 |
| 3e | 234 | 579 | 590 |
| 3f (comp) | Broke up | — | 644 |
| 3g (comp) | 370 | — | 670 |

Referring to Table 2, it should be noted that the sulphonated polyetherketone polymer (Example 3g) had a substantially higher boiling water uptake compared to the copolymers of Examples 3a to 3e for comparable EW. In the case of sulphonated polyetheretherketone (Example 3f) the boiling water uptake was so high that the polymeric material broke up. It is highly surprising that whereas respective homopolymers of sulphonated polyetheretherketone and sulphonated polyetherketone have very high boiling water uptakes, copolymers comprising sulphonated polyetheretherketone with polyetherketone have significantly lower boiling water uptakes for similar EWs.

EXAMPLE 5

Post Treatment of the Membranes of Examples 4a, 4c and 4e with Acetone

The 5 cm×5 cm×40 microns sample of membrane from Examples 4a, 4c and 4e were immersed in refluxing acetone (100 ml) for 60 mins, removed and dried in an oven at 50° C. for 1 day, immersed in boiling deionised water (500 ml) for 60 mins, removed and dried quickly with lint-free paper to remove surface water, weighed, dried in an oven at 50° C. for 1 day, allowed to cool to ambient temperature in a desiccator then weighed quickly. The % water-uptake was calculated as described previously and summarised in Table 3.

TABLE 3

| Sulphonated polymer from Example No. | Boiling water uptake as described in Example 4 (%) | Boiling water uptake after acetone treatment as described in Example 5 (%) |
| --- | --- | --- |
| 3a | 59 | 61 |
| 3c | 135 | 84 |
| 3e | 234 | 100 |

The acetone treatment can increase crystallinity of crystalline polyaryletherketones. Table 3 shows that a substantial reduction in boiling water uptake can be achieved in some circumstances (Examples 3c and 3e). In some cases, where crystallinity of the polymer is already high, the acetone treatment cannot effect an increase (Example 3a).

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A fuel cell or an electrolytic cell comprising an ion-conductive polymeric material which includes a first repeat unit of formula:

—(O-Ph$^1$-CO-Ph$^1$-O-Ph$^1$-CO-Ph$^1$)—   I and a second repeat unit of formula —(O-Ph$^3$-O-Ph$^3$-CO-Ph$^4$)—   II or of formula —(O-Ph$^2$-O-Ph$^3$-SO$_2$-Ph$^4$)—   III wherein Ph$^1$, Ph$^2$, Ph$^3$ and Ph$^4$ independently represent phenyl moieties and wherein said second repeat unit is provided with ion-exchange sites.

2. A cell according to claim 1, wherein said ion-conductive polymeric material is crystalline.

3. A cell according to claim 1, wherein said ion-conductive polymeric material includes a repeat unit which is crystalline and a repeat unit which is amorphous.

4. A cell according to claim 1, wherein said first repeat unit is crystalline.

5. A cell according to claim 1, wherein said first repeat unit comprises unsubstituted phenyl groups Ph$^1$ with said groups Ph$^1$ having 1,4-linkages to the —O— and —CO— groups to which they are bonded.

6. A cell according to claim 4, wherein said second repeat unit includes ion-exchange sites.

7. A cell according to claim 6, wherein said second repeat unit is sulphonated.

8. A cell according to claim 1, wherein Ph$^3$ represents an unsubstituted phenyl group having 1,4-linkages to the —O— and —CO— or —SO$_2$— groups to which it is bonded.

9. A cell according to claim 8, wherein Ph$^4$ represents an unsubstituted phenyl group having 1,4-linkages to the —O— and —CO— or —SO$_2$— groups to which it is bonded.

10. A cell according to claim 9, wherein Ph$^2$ represents a phenyl group provided with an ion-exchange site wherein the phenyl group has 1,4-linkages to the —O— groups to which it is bonded.

11. A cell according to claim 1, wherein less than 1 mole % of groups Ph$^1$ in said polymeric material are functionalised; less than 1 mole of groups Ph$^3$ in said second unit are functionalised; less than 1 mole % of groups Ph$^4$ are functionalised; and greater than 70 mole % of groups Ph$^2$ in said second unit are provided with ion-exchange sites.

12. A cell according to claim 1, wherein said second repeat unit is an -ether-(monosulphonated)phenyl-ether- (unsubstituted)phenyl-carbonyl-unsubstituted)phenyl- unit.

13. A cell according to claim 1, wherein the ratio of mole % of units of formula I in said ion-conductive polymeric material to the sum of the mole % of units of formula II and III in said polymeric material is less than 4 but is at least 0.15.

14. A cell according to claim 1, wherein said ion-conductive polymeric material includes a third repeat unit which is different from units II and III, wherein said third unit is amorphous.

15. A cell according to claim 14 which includes at least one of the following: a sulphone moiety in the polymer backbone; a 1,3-disubstituted phenyl moiety in the polymer backbone; or a functional group pendent from a phenyl moiety in the polymer backbone.

16. A cell according to claim 1, wherein the equivalent weight (EW) of said ion-conductive polymeric material is less than 850 g/mol and is greater than 300 g/mol.

17. A polymer electrolyte membrane for a fuel cell or electrolytic cell, the membrane comprising an ion-conductive polymeric material according to claim 1.

18. A membrane electrode assembly for a fuel cell which comprises an ion-conductive polymeric material as described in claim 1 associated with a catalyst material.

19. A method of making a fuel cell or electrolytic cell, the method comprising incorporating an ion-conductive polymeric material as described in claim 1 into said fuel cell or electrolytic cell.

* * * * *